US011858453B1

(12) United States Patent
Deng et al.

(10) Patent No.: US 11,858,453 B1
(45) Date of Patent: Jan. 2, 2024

(54) VEHICLE SEAT WITH AIRBAG

(71) Applicant: Ford Global Technologies, LLC, Dearborn, MI (US)

(72) Inventors: Zhibing Deng, Northville, MI (US); Joseph E. Abramczyk, Farmington Hills, MI (US); Lavanya Vemuri, Saline, MI (US); Selvakumar Inbaraj Daniel, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/164,949

(22) Filed: Feb. 6, 2023

(51) Int. Cl.
| | |
|---|---|
| *B60R 21/2338* | (2011.01) |
| *B60R 21/207* | (2006.01) |
| *B60R 21/231* | (2011.01) |
| *B60R 21/233* | (2006.01) |

(52) U.S. Cl.
CPC ........ *B60R 21/2338* (2013.01); *B60R 21/207* (2013.01); *B60R 21/233* (2013.01); *B60R 21/23138* (2013.01); *B60R 2021/23107* (2013.01); *B60R 2021/23146* (2013.01); *B60R 2021/23382* (2013.01)

(58) Field of Classification Search
CPC .............. B60R 21/2338; B60R 21/207; B60R 21/23138; B60R 2021/23146; B60R 2021/23382
See application file for complete search history.

(56) References Cited

U.S. PATENT DOCUMENTS

| | | | |
|---|---|---|---|
| 5,636,862 A * | 6/1997 | Cheung ............... | B60R 21/2338 280/730.2 |
| 6,572,137 B2 | 6/2003 | Bossecker et al. | |
| 7,128,337 B2 * | 10/2006 | Kwon ................ | B60R 21/2338 280/743.1 |
| 8,579,324 B2 | 11/2013 | Kwon | |
| 9,682,681 B1 | 6/2017 | Patel et al. | |
| 10,189,431 B2 | 1/2019 | Yamamoto et al. | |
| 10,703,322 B2 * | 7/2020 | Kitagawa .......... | B60R 21/23138 |
| 10,800,368 B2 | 10/2020 | Kitagawa | |
| 10,864,881 B2 * | 12/2020 | Park ...................... | B60R 21/207 |
| 11,427,149 B2 | 8/2022 | Tensel | |

(Continued)

FOREIGN PATENT DOCUMENTS

| | | | |
|---|---|---|---|
| JP | 2014162391 A | * | 9/2014 |
| JP | 2020142716 A | * | 9/2020 |

(Continued)

*Primary Examiner* — Faye M Fleming
(74) *Attorney, Agent, or Firm* — Frank A. MacKenzie; Bejin Bieneman PLC (57) ABSTRACT

An assembly includes a seat back having a top end and a bottom end. The assembly includes an airbag supported by the seat back at the top end. The airbag is inflatable to an inflated position that extends forward and upward from the top end of the seat back. The airbag in the inflated position has an inboard panel and outboard panel that define an inflation chamber therebetween. The assembly includes a tether in the inflation chamber, the tether fixed to the inboard panel and the outboard panel between a front edge of the tether and a rear edge of the tether. The front edge of the tether defines a first width and the rear edge of the tether defines a second width that is less than the first width.

16 Claims, 6 Drawing Sheets

(56) References Cited

U.S. PATENT DOCUMENTS

| | | | |
|---|---|---|---|
| 11,613,225 B2 * | 3/2023 | Williams | B60R 21/231 |
| | | | 280/743.2 |
| 2010/0171295 A1 * | 7/2010 | Koh | B60R 21/2338 |
| | | | 280/743.2 |
| 2019/0054957 A1 | 2/2019 | Faruque et al. | |

FOREIGN PATENT DOCUMENTS

| | | | |
|---|---|---|---|
| KR | 20170051824 A | * | 5/2017 |
| WO | 2021111723 A1 | | 6/2021 |

* cited by examiner

VEHICLE SEAT WITH AIRBAG

BACKGROUND

A vehicle may include one or more airbags deployable during certain vehicle impacts to control kinematics of occupants inside the vehicle during certain impacts. The airbag may be a component of an airbag assembly including a housing supporting the airbag, and an inflation device in communication with the airbag for inflating the airbag from an uninflated position to an inflated position.

DETAILED DESCRIPTION

An assembly includes a seat back having a top end and a bottom end. The assembly includes an airbag supported by the seat back at the top end. The airbag is inflatable to an inflated position that extends forward and upward from the top end of the seat back. The airbag in the inflated position has an inboard panel and outboard panel that define an inflation chamber therebetween. The assembly includes a tether in the inflation chamber. The tether is fixed to the inboard panel and the outboard panel between a front edge of the tether and a rear edge of the tether. The front edge of the tether defines a first width, and the rear edge of the tether defines a second width that is less the first width.

The airbag in the inflated position may extend above the top end of the seat back.

The assembly may include a headrest supported by the seat back at the top end, the airbag in the inflated position forward of and aligned with the headrest.

The front edge of the tether may be at a front surface of the headrest.

The front edge of the tether may be above the rear edge of the tether relative to the seat back.

The front edge of the tether may be above the top end of the seat back.

The inflation chamber may extend forward of the front edge of the tether and rearward of the rear edge of the tether.

The tether may separate the inflation chamber into a top portion and a bottom portion, the top portion may be open to the bottom portion forward and rearward of the tether.

The assembly may include a second airbag supported by the seat back between the airbag and the bottom end of the seat back, the second airbag inflatable to a second inflated position below the airbag in the inflated position.

The airbag in the inflated position may include a bottom edge and the second airbag in the second inflated position may include a top edge that extends transverse to the bottom edge.

The bottom edge of the airbag may abut the top edge of the second airbag proximate to the seat back and may be spaced distal from the seat back.

The seat back may include a first side and a second side spaced from each other along a lateral axis, the airbag and the second airbag supported at the first side.

The assembly may include a seat bottom, the seat back supported by the seat bottom at the bottom end of the seat back, the second airbag in the second inflated position between the airbag in the inflated position and the seat bottom.

The seat back and the seat bottom may collectively define an occupant seating area having an occupant torso portion and an occupant head portion, the airbag in the inflated position may be at the occupant head portion and the second airbag in the second inflated position at the occupant torso portion.

The occupant seating area, including the occupant head portion, may correspond to a 50th percentile adult male hybrid III dummy.

The airbag may be inflatable independent of the second airbag.

With reference to the Figures, wherein like numerals indicate like parts throughout the several views, a vehicle 20 having a seat 22 is shown. The seat 22 includes a seat back 24 having a top end 26 and a bottom end 28. The seat 22 includes a first airbag 30 supported by the seat back 24 at the top end 26. The first airbag 30 is inflatable to a first inflated position that extends forward and upward from the top end 26 of the seat back 24 relative to the seat 22. The first airbag 30 in the first inflated position has an inboard panel 32 and outboard panel 34 that define an inflation chamber 36 therebetween. The seat 22 includes a tether 38 in the inflation chamber 36. The tether 38 is fixed to the inboard panel 32 and the outboard panel 34 between a front edge 40 of the tether 38 and a rear edge 42 of the tether 38. The front edge 40 of the tether 38 defines a first width W1. The rear edge 42 of the tether 38 defines a second width W2 that is less the first width W1.

The first airbag 30 in the first inflated position may control kinematics of a head H of an occupant O of the seat 22, e.g., subsequent to detection of certain impacts to the vehicle 20 and related inflation of the first airbag 30. The tether 38 may limit movement of the inboard panel 32 away from the outboard panel 34 and increase reaction pressure provided against the head H by the first airbag 30, e.g., relative to an airbag not having the tether 38 (not shown). In other words, the tether 38 may limit a volume of the inflation chamber 36 at the tether 38 and an amount of inflation medium than can enter such volume from other portions of the inflation chamber 36 when force is applied to the first airbag 30, e.g., forward of the tether 38 in the first inflated position.

Figure 1:
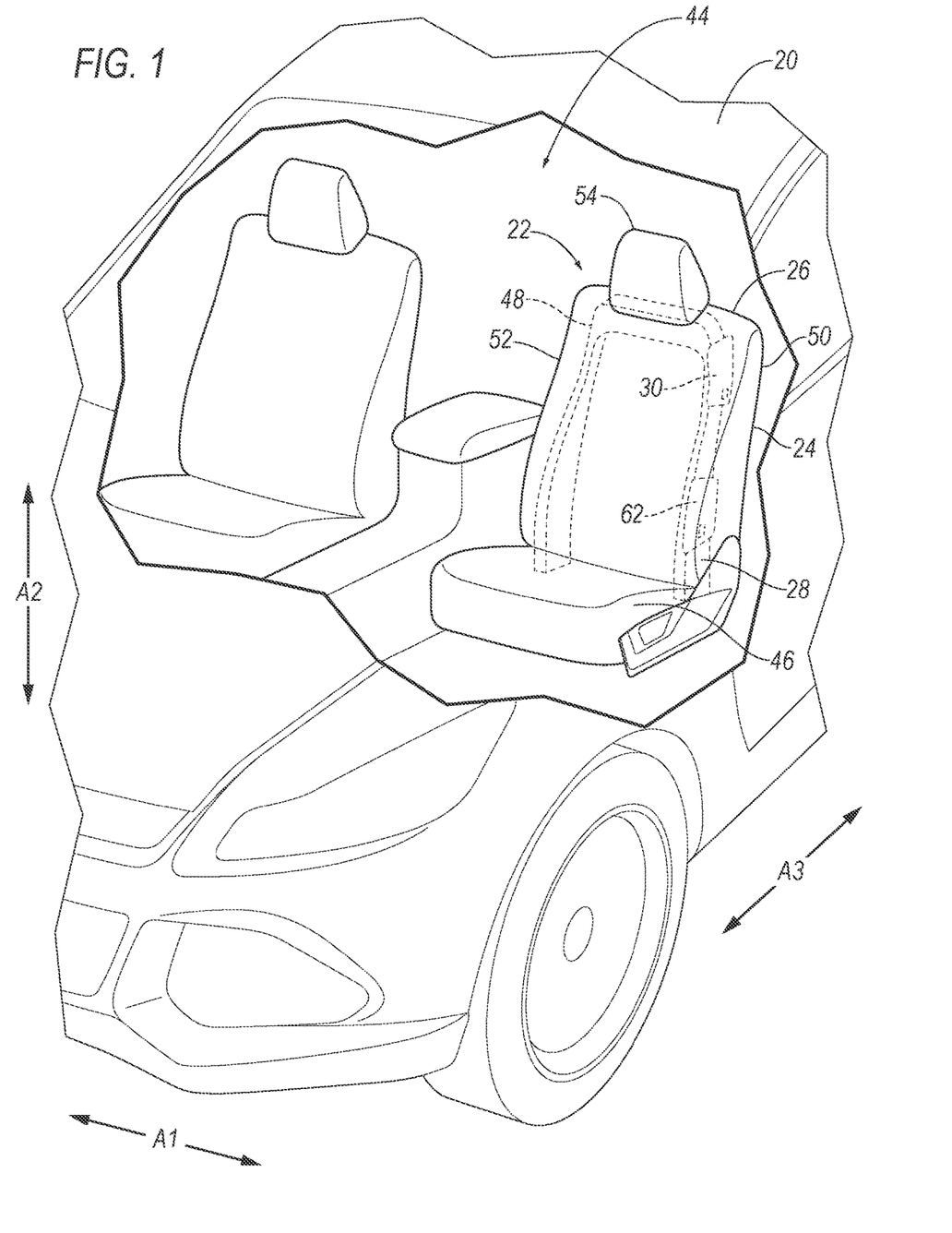
FIG. 1 is a perspective view of a portion of a vehicle with a break away to show a passenger cabin of the vehicle with a seat.
Figure 2:
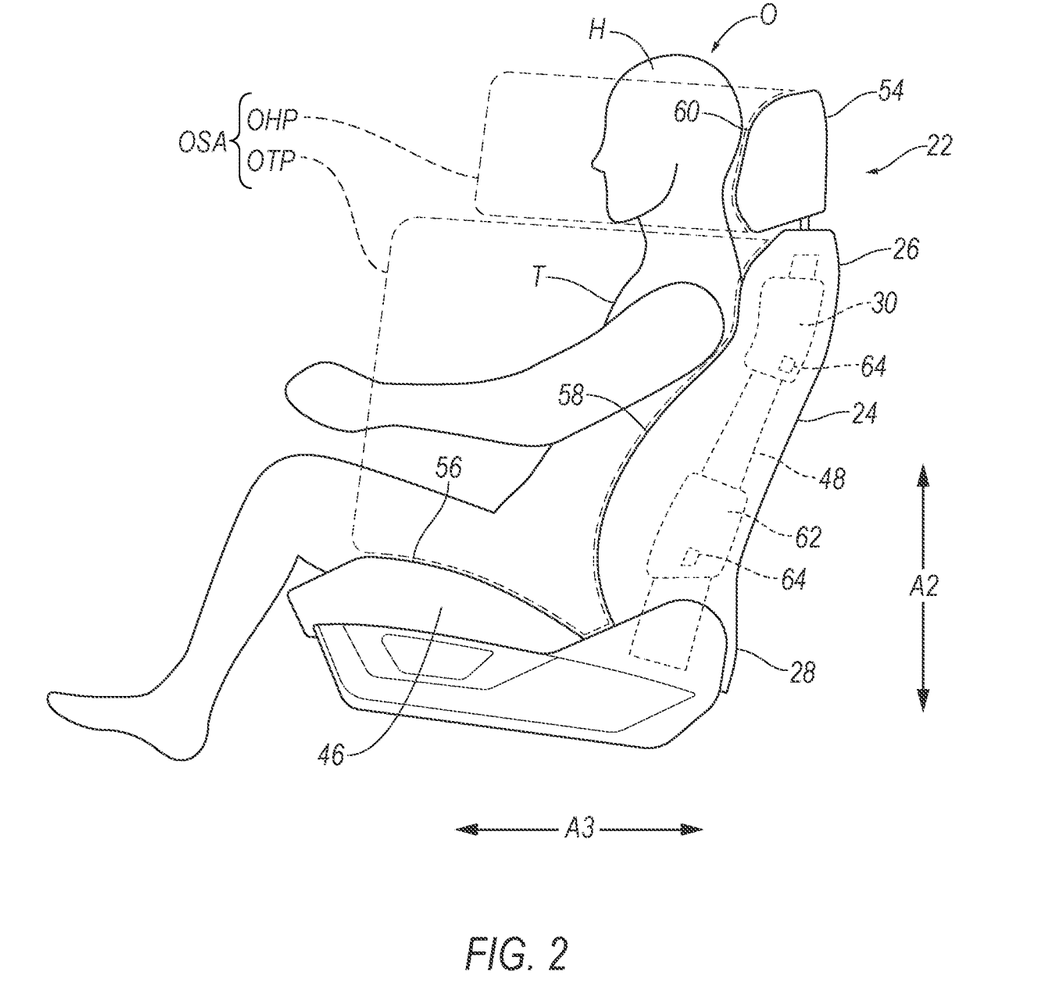
FIG. 2 is a side view of the seat with airbags in uninflated positions.

With reference to FIG. 1, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc. The vehicle 20, for example, may be an autonomous vehicle. In other words, the vehicle 20 may be autonomously operated such that the vehicle 20 may be driven without constant attention from a driver, i.e., the vehicle 20 may be self-driving without human input.

The vehicle 20 may define a passenger cabin 44 to house occupants, if any, of the vehicle 20. The passenger cabin 44 may extend across the vehicle 20, i.e., from one side to the other side of the vehicle 20 along a lateral axis A1. The passenger cabin 44 includes a front end and a rear end with the front end being in front of the rear end during forward movement of the vehicle 20.

One or more seats 22 may be supported in the passenger cabin 44, e.g., by a floor of the vehicle 20. Each seat 22 may include the seat back 24 and a seat bottom 46 that can support the occupant O of the seat 22. For example, the occupant O of the seat 22 may sit atop the seat bottom 46 and recline against the seat back 24.

With reference to FIGS. 1-4, the seat back 24 may include a seat back frame 48 and a covering (not numbered) supported on the seat back frame 48. The seat back frame 48 may include tubes, beams, etc. Specifically, the seat back frame 48 includes a pair of upright frame members. The upright frame members are elongated, and specifically, are elongated in a generally upright direction when the seat back 24 is in a generally upright position. The upright frame members are spaced from each other along the lateral axis A1. The seat back frame 48 may include cross-members (not shown) extending between the upright frame members. The seat back frame 48, including the upright frame members, may be of any suitable plastic material, e.g., carbon fiber reinforced plastic (CFRP), glass fiber-reinforced semi-finished thermoplastic composite (organosheet), etc. As another example, some or all components of the seat back frame 48 may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seat back frame 48 and may be foam or any other suitable material.

The seat back 24 has the top end 26 and the bottom end 28. The bottom end 28 is at, e.g., abuts, the seat bottom 46. The top end 26 is spaced from, e.g., distal to, the seat bottom 46. In other words, the top end 26 and the bottom end 28 are opposite ends, with the top end 26 above the bottom end 28 along a vertical axis A2. The seat back 24 includes a first side 50 and a second side 52 spaced from each other along the lateral axis A1. The lateral axis A1 is perpendicular to the vertical axis A2. For example, the first side 50 may be at a right of the occupant O seated in the seat 22, and the second side 52 may be at a left of the occupant O. The first side 50 may be outboard of the second side 52 relative to vehicle 20. In other words, the first side 50 may be farther from a center of the vehicle 20 than the second side 52 from the center of the vehicle 20 along the lateral axis A1.

The seat back 24 is supported by the seat bottom 46 at the bottom end 28 of the seat back 24, e.g., via the seat back frame 48. The seat bottom 46 extends forward from the seat back 24 relative to the seat 22. The seat back 24 may be stationary or movable relative to the seat bottom 46. The seat back 24 and the seat bottom 46 may be adjustable in multiple degrees of freedom. Specifically, the seat back 24 and the seat bottom 46 may themselves be adjustable, in other words, adjustable components within the seat back 24 and/or the seat bottom 46, and/or may be adjustable relative to each other.

The seat 22 may include a headrest 54. The headrest 54 may control kinematics of the head H of the occupant O of the seat 22. The headrest 54 is supported by the seat back 24 at the top end 26 of the seat back 24. The headrest 54 may be stationary or movable relative to the seat back 24. The seat back 24 may be supported by the seat bottom 46 and may be stationary or movable relative to the seat bottom 46. The seat back 24 and the headrest 54 may be adjustable in multiple degrees of freedom. Specifically, the seat back 24 and/or the headrest 54 may themselves be adjustable and/or may be adjustable relative to each other.

The seat back 24 and the seat bottom 46 collectively define an occupant seating area OSA. The occupant seating area OSA is a volume relative to the seat 22 which is occupied by the occupant O when seated on the seat bottom 46 reclining against the seat back 24. The occupant seating area OSA extends upward from a top surface 56 of the seat bottom 46 and forward from a front surface 58 of the seat back 24. The occupant seating area OSA may have an occupant torso portion OTP and an occupant head portion OHP. The occupant torso portion OTP is a volume relative to the seat 22 which is occupied by a torso T of the occupant O when seated on the seat bottom 46 reclining against the seat back 24. The occupant head portion OHP is a volume relative to the seat 22 which is occupied by the head H the occupant O when seated on the seat bottom 46 reclining against the seat back 24. The occupant head portion OHP is above the occupant torso portion OTP. The occupant torso portion OTP may extend upward from the top surface 56 of the seat bottom 46, e.g., to the top end 26 of the seat back 24. The occupant head portion OHP may extend upward from the occupant torso portion OTP, e.g., upward beyond the top end 26 of the seat back 24. The occupant seating area OSA may be defined by the headrest 54. For example, the occupant head portion OHP may be at the headrest 54 along the vertical axis A2, and the occupant torso portion OTP may be below the headrest 54. The occupant head portion OHP may extend forward from a front surface 60 of the headrest 54. The occupant seating area OSA, including the occupant head portion OHP, may correspond to a 50th percentile adult male hybrid III dummy. In other words, a torso of the 50th percentile adult male hybrid III dummy positioned in the seat 22 may occupy the occupant torso portion OTP and a head H of the 50th percentile adult male hybrid III dummy positioned in the seat 22 may occupy the occupant head portion OHP.

The seat 22 includes one or more airbags 30, 62 for controlling kinematics of the occupant O of the seat 22. The airbags 30, 62 are independently inflatable from uninflated positions to inflated positions, e.g., inflators 64 may actuate to inflate the airbags 30, 62 in response to an instruction received from a computer 66 (shown in FIG. 7). For example, the seat 22 may include the first airbag 30 inflatable to the first inflated position for controlling kinematics of the head H of the occupant O and the seat 22 may include a second airbag 62 inflatable to a second inflated position for controlling kinematics of the torso T of the occupant O.

Each airbag 30, 62 may be formed of a woven polymer or any other material. As one example, the airbags 30, 62 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Each of the airbags 30, 62 may be supported by a respective housing (not shown), e.g., a first housing supporting the first airbag 30 and a second housing supporting the second airbag 62. The housings may provide reaction surfaces for the airbags 30, 62 in the inflated positions. The housings may be any material, e.g., a rigid polymer, a metal, a composite, etc.

The first airbag 30 is supported at the first side 50 of the seat back 24 at the top end 26. For example, the housing containing the first airbag 30 may be fixed to the seat back frame 48 at the top end 26 at the first side 50 of. The second airbag 62 may be supported on a same side as the first airbag 30, e.g., the second airbag 62 may also be supported at the first side 50 of the seat back 24. The second airbag 62 may be supported the seat back 24 between the top end 26 and the bottom end 28, e.g., therebetween along the vertical axis V2. In other words, the second airbag 62 may be supported by the seat back 24 between the first airbag 30 and the bottom end 28 of the seat back 24. For example, the housing containing the second airbag 62 may be fixed to the first side 50 of the seat back frame 48 below the first airbag 30. The first airbag 30 may be inflatable independent of the second airbag 62, and vice versa. In other words, the first airbag 30 or the second airbag 62 may be inflated without inflating the other of the first airbag 30 or the second airbag 62. The first airbag 30 or the second airbag 62 may be inflated concurrently or sequentially, i.e., one before the other.

With reference to FIGS. 2-6, the first airbag 30 in the first inflated position is shown. The first airbag 30 in the first inflated position extends forward and upward from the top end 26 of the seat back 24, e.g., above the top end 26 of the seat back 24. In other words, the first airbag 30 in the first inflated position extends from the seat back 24 beyond the front surface 58 and away from the seat bottom 46, e.g., beyond the top end 26 of the seat back 24. The first airbag 30 in the first inflated position may be at the occupant head portion OHP, e.g., aligned with the occupant head portion OHP along the vertical axis A2 and a longitudinal axis A3, and adjacent the occupant head portion OHP along the lateral axis A1 vehicle-outboard of the seat back 24. The first airbag 30 in the first inflated position may extend forward of the front surface 60 of the headrest 54 along the longitudinal axis A3 and be aligned with the headrest 54 along the vertical axis A2.

The first airbag 30 in the first inflated position includes a top edge 68 and a bottom edge 70. The top edge 68 is above and opposite the bottom edge 70. The first airbag 30 in the first inflated position includes a front edge 72 spaced from seat back 24 and extending from the top edge 68 to the bottom edge 70.

Figure 5:
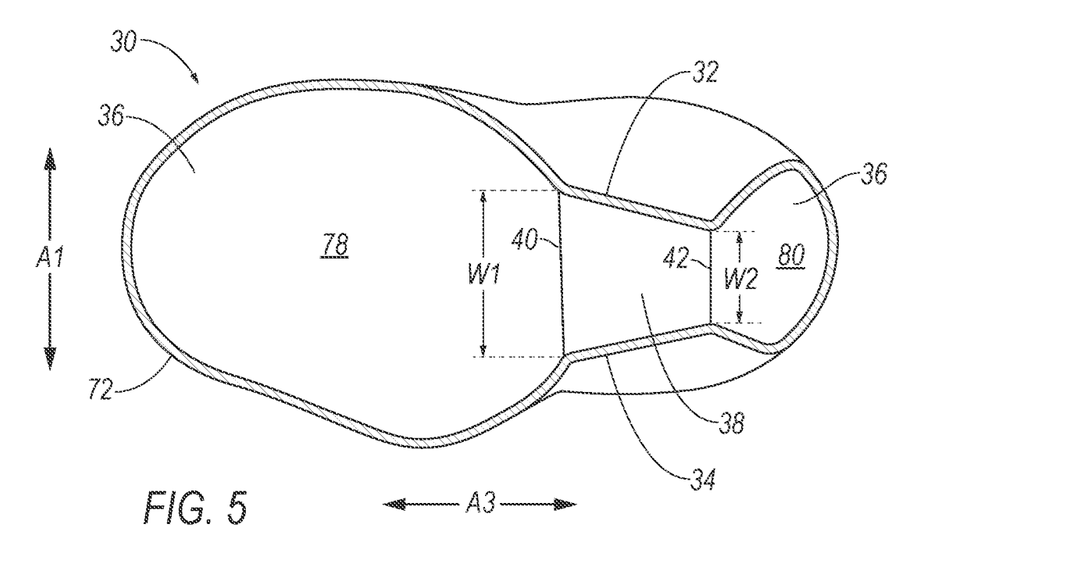
FIG. 5 is a top section view of the airbag in the inflated position showing a tether internal of the airbag.
Figure 6:
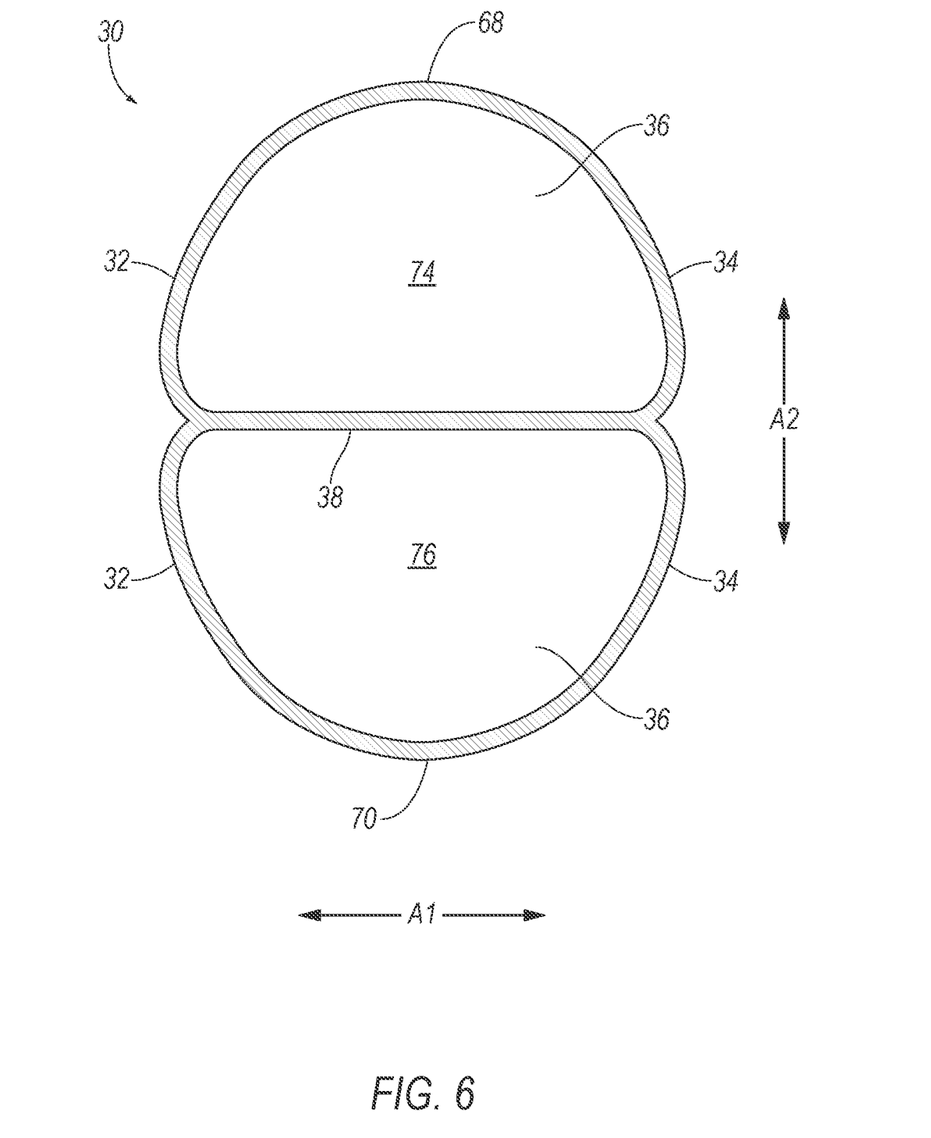
FIG. 6 is a front section view of the airbag in the inflated position at the tether.

The inboard panel 32 is vehicle-inboard of the outboard panel 34. In other words, the outboard panel 34 is vehicle-outboard of the inboard panel 32. The inboard panel 32 and the other panel of the first airbag 30 may be woven fabric, or any suitable material. The inboard panel 32 may be connected to the outboard panel 34 along the top edge 68, the bottom edge 70, and the front edge 72. The inboard panel 32 may be connected to the outboard panel 34 may be connected to the outboard panel 34 with stitching, adhesive, friction, weld, or via any suitable structure. The inboard panel 32 and the outboard panel 34 may be provided by a same sheet of woven material. The inboard panel 32 and the outboard panel 34 define the inflation chamber 36 therebetween, e.g., along the lateral axis A1. The inflation chamber 36 may extend from the top edge 68 to the bottom edge 70, e.g., along the vertical axis A2. The inflation chamber 36 may extend from the seat back 24 to the front edge 72, e.g., along the longitudinal axis A3. The first airbag 30 is inflated to the first inflated position by providing inflation medium to the inflation chamber 36.

The tether 38 in the inflation chamber 36 controls deformation and dynamics of the first airbag 30 in the first inflated position, e.g., to control kinematics of the head H of the occupant O. For example, the tether 38 may control spacing of the inboard panel 32 from the outboard panel 34 along the lateral axis A1 and prevent widening of the first airbag 30 at the tether 38. The spacing between the inboard panel 32 and the outboard panel 34 may be less than forward of the tether 38, e.g., such that normal forces between the inboard panel 32 and the head H urge the head H rearward, or at least limit an amount of forward urge applied to the head H.

The tether 38 extends from the front edge 40 of the tether 38 to the rear edge 42. The front edge 40 and the rear edge 42 may be distal most edges of the tether 38. The tether 38 is fixed to the inboard panel 32 and the outboard panel 34 between the front edge 40 and the rear edge 42, e.g., via stitching, adhesive, friction weld, or any suitable structure. The tether 38 may be fixed to the inboard panel 32 and/or the outboard panel 34 continuously from the front edge 40 the rear edge 42. The tether 38 may be planar, e.g., formed of a single panel of woven material.

The first width W1 defined by the front edge 40 of the tether 38 extends from the inboard panel 32 to the outboard panel 34 along the lateral axis A1. The second width W2 defined by the rear edge 42 of the tether 38 also extends from the inboard panel 32 to the outboard panel 34 along the lateral axis A1. The second width W2 is less the first width W1. In other words, the front edge 40 of the tether 38 is wider than the rear edge 42 along the lateral axis A1. A spacing from the front edge 40 to the rear edge 42 may be greater than the first width W1 and the second width W2. In other words, the tether 38 may be longer than wide.

The front edge 40 is forward of the rear edge 42 relative to the seat 22. For example, the front edge 40 of the tether 38 may be between the front edge 40 of the first airbag 30 and the rear edge 42 of the tether 38 along the longitudinal axis A3. The front edge 40 of the tether 38 is above the rear edge 42 of the tether 38 relative to the seat back 24. For example, the rear edge 42 of the tether 38 may be between the top edge 68 of the tether 38 and the bottom end 28 of the seat back 24 along the vertical axis A2.

The front edge 40 of the tether 38 may at the front surface 60 of the headrest 54, e.g., aligned with each other along the longitudinal axis A3. In other words, the tether 38 may extend from the rear edge 42 to the front surface 60. The front edge 40 of the tether 38 may be above the top end 26 of the seat back 24. In other words, the top end 26 of the seat back 24 may be between the front edge 40 of the tether 38 and the bottom end 28 of the seat back 24 along the vertical axis A2.

The tether 38 separates the inflation chamber 36 into a top portion 74 and a bottom portion 76. The top portion 74 is above the tether 38. In other words, the tether 38 is between the top portion 74 and the bottom end 28 of the seat back 24 along the vertical axis A2. The bottom portion 76 is below the tether 38. In other words, the bottom portion 76 is between the tether 38 and the bottom end 28 of the seat back 24 along the vertical axis A2. The inflation chamber 36 extends forward of the front edge 40 of tether 38, e.g., along the longitudinal axis A3 to the front edge 40 of the first airbag 30 in the first inflated position and beyond the front edge 40 of the tether 38. The inflation chamber 36 extends rearward of the rear edge 42 of the tether 38 e.g., along the longitudinal axis A3 away from the front edge 40 of the first airbag 30 in the first inflated position beyond the rear edge 42 of the tether 38. The top portion 74 may be open to the bottom portion 76 forward and rearward of the tether 38. In other words, inflation medium may flow from the top portion 74 to the bottom portion 76, or vice versa, at a first opening 78 connecting the top portion 74 to the bottom portion 76 forward of the front edge 40 and at a second opening 80 connecting the top portion 74 to the bottom portion 76 rearward of the rear edge 42.

Figure 3:
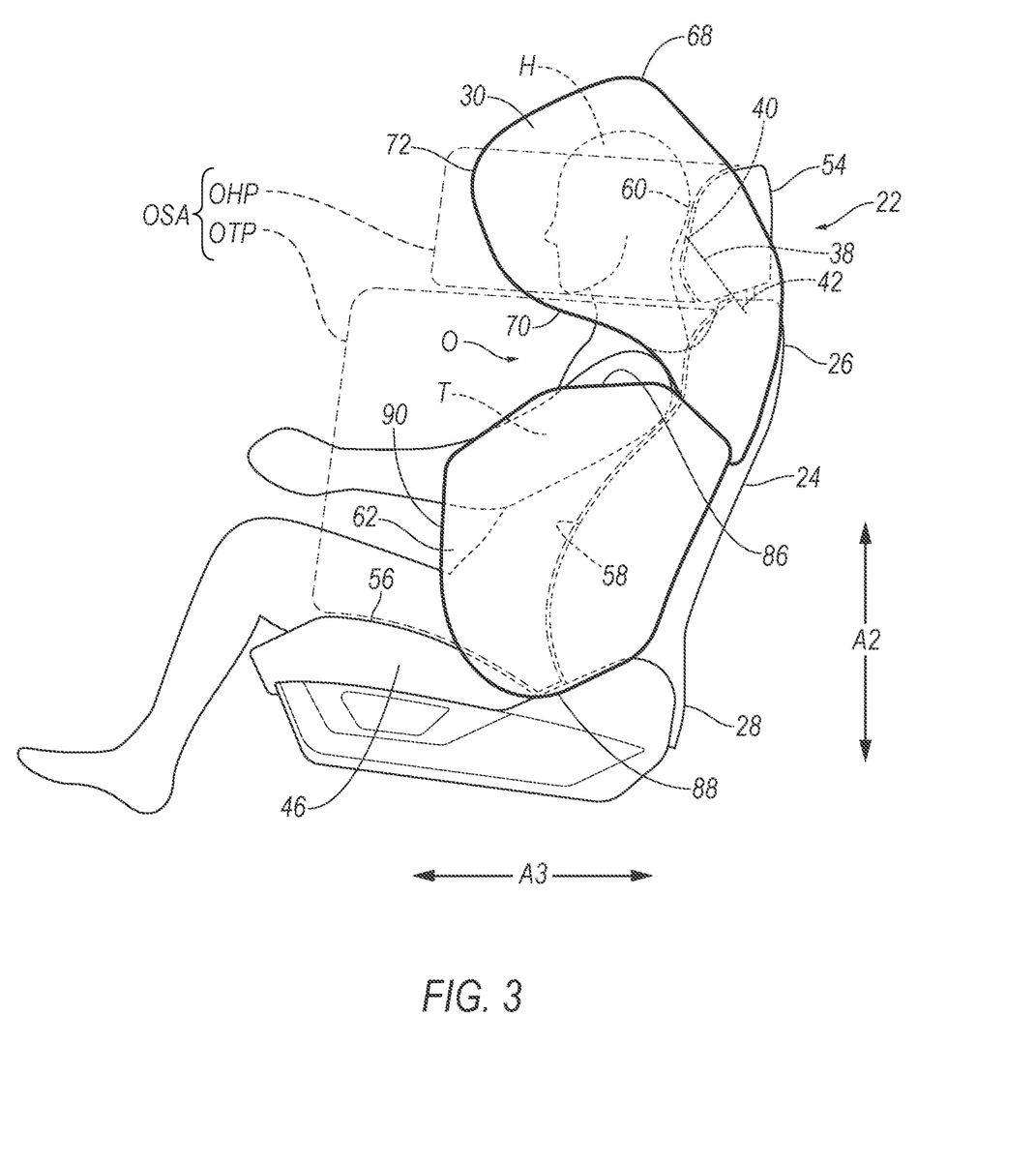
FIG. 3 is a side view of the seat with the airbags inflated positions.
Figure 4:
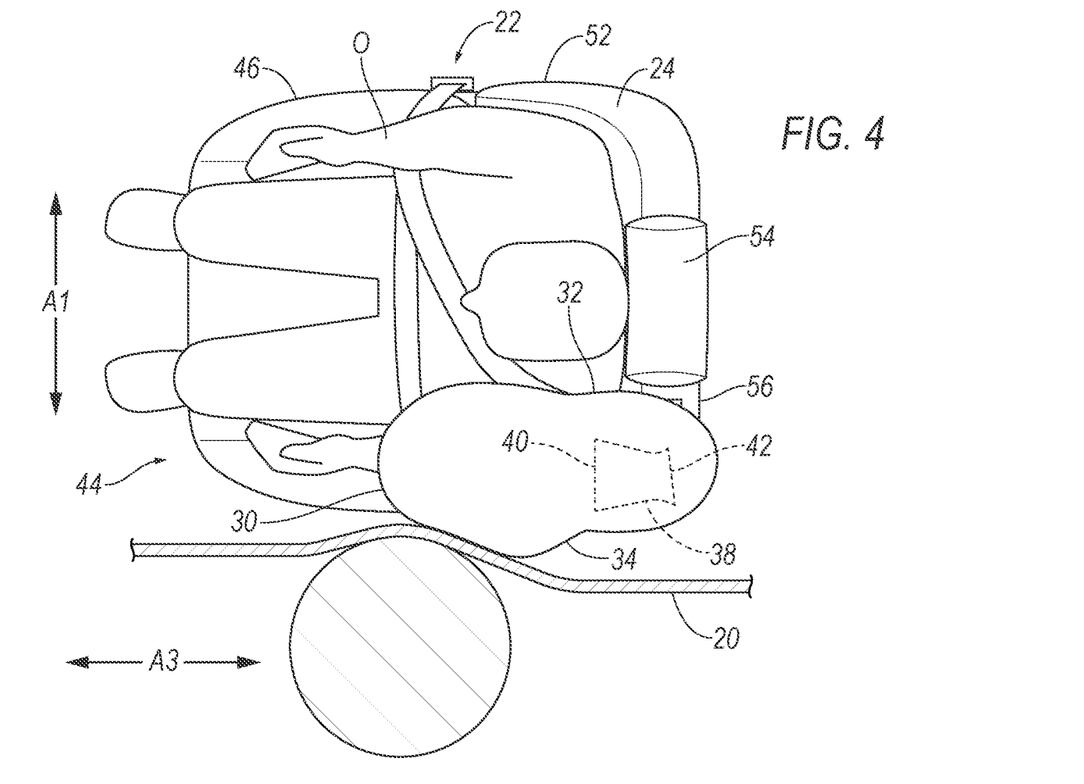
FIG. 4 is a top view of the seat with the airbags inflated positions.

With reference to FIG. 3, the second airbag 62 inflated with inflation medium to the second inflated position is shown. The second airbag 62 in the second inflated position is below the first airbag 30 in the first inflated position. In other words, the second airbag 62 in the second inflated position may be closer to the bottom end 28 of the seat back 24 than the first airbag 30 in the first inflated position is to the bottom end 28. For example, the second airbag 62 in the second inflated position may be between the first airbag 30 in the first inflated position and the seat bottom 46 the vertical axis A2. The second airbag 62 in the second inflated position may be at the occupant torso portion OTP, e.g., aligned with the occupant torso portion OTP along the vertical axis A2 and the longitudinal axis A3 and adjacent the occupant torso portion OTP along the lateral axis A1 vehicle-outboard of the seat back 24. The second airbag 62 in the second inflated position may be below the headrest 54 along the vertical axis A2.

The second airbag 62 in the second inflated position includes a top edge 74 and a bottom edge 76. The top edge 74 is above and opposite the bottom edge 76. The second airbag 62 in the second inflated position includes a front edge 78 spaced from seat back 24 and extending from the top edge 74 to the bottom edge 76. The top edge 74 of the second airbag 62 in the second inflated position may extend transverse to the bottom edge 70 of the first airbag 30 in the first inflated position. In other words, the top edge 74 of the second airbag 62 in the second inflated position and the bottom edge 70 of the first airbag 30 in the first inflated position may be other than parallel to each other. The bottom edge 70 of the first airbag 30 may abut the top edge 74 of the second airbag 62 proximate to the seat back 24 and may be spaced from each other distal from the seat back 24. For example, a spacing along the vertical axis A2 between the top edge 74 of the second airbag 62 in the second inflated position and the bottom edge 70 of the first airbag 30 in the first inflated position may increase as the top edge 74 of the second airbag 62 and the bottom edge 70 of the first airbag 30 extends forward and away from the seat back 24.

The seat 22 may include one or more inflators 64 for inflating the airbags 30, 62 to the inflated positions. The inflators 64 provide inflation medium to inflate the airbags 30, 62 from uninflated positions to the inflated positions. Each inflator 64 may be, for example, a pyrotechnic inflator that uses a chemical reaction to drive inflation medium to the first airbag 30 and/or the second airbag 62. The inflators 64 may be of any suitable type, for example, a cold-gas inflator. Each inflator 64 may be in fluid communication with one or more of the first airbag 30 and/or the second airbag 62, e.g., directly, through various piping, etc. For example, one inflator 64 may provide inflation medium to the first airbag 30 and the second airbag 62. As another example, one inflator 64 may provide inflation medium only to the first airbag 30 and another inflator 64 may provide inflation medium only to the second airbag 62. The inflators 64 may be supported by the housings, seat back frame 48, or by any other suitable structure of the seat 22.

Figure 7:
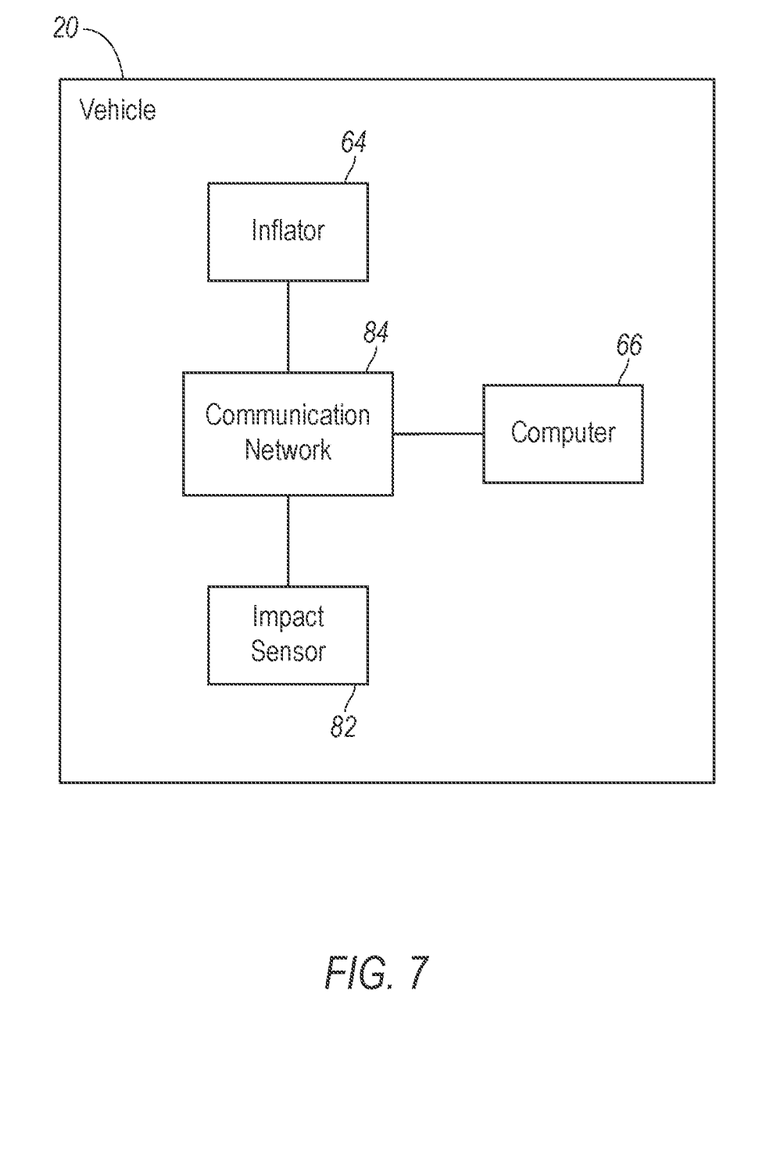
FIG. 7 is a block diagram of components of the vehicle.

With reference to FIG. 7, the vehicle 20 may include at least one impact sensor 82 for sensing certain impacts of the vehicle 20. The impact sensor 82 may be in communication with the computer 66. The impact sensor 82 is configured to detect certain impacts to the vehicle 20. Alternatively or additionally to sensing certain impacts, the impact sensor 82 may be configured to sense certain impacts prior to impact, i.e., pre-impact sensing. The impact sensor 82 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensor 82 may be located at numerous points in or on the vehicle 20.

The vehicle 20 may include a communication network 84. The communication network 84 includes hardware, such as a communication bus, for facilitating communication among vehicle components, e.g., the computer 66, the impact sensor 82, the inflators 64, etc. The communication network 84 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 66 may be a microprocessor-based computer implemented via circuits, chips, or other electronic components. For example, the computer 66 may include a processor, a memory, etc. The memory of the computer 66 may include memory for storing programming instructions executable by the processor as well as for electronically storing data and/or databases.

The computer 66 may be programmed to actuate one or more of the inflators 64, e.g., to provide an impulse to a pyrotechnic charge of one or more of the inflators 64. The computer 66 may actuate the inflator 64 in response to detecting certain vehicle impacts. For example, the computer 66 may actuate the one or more inflators 64 to inflate the airbags 30, 62 upon detecting a certain vehicle impact based on information received from the impact sensor 82.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    a seat back having a top end and a bottom end;
    an airbag supported by the seat back at the top end, the airbag inflatable to an inflated position that extends forward and upward from the top end of the seat back, the airbag in the inflated position having an inboard panel and outboard panel that define an inflation chamber therebetween; and
    a tether in the inflation chamber, the tether fixed to the inboard panel and the outboard panel between a front edge of the tether and a rear edge of the tether, the front edge of the tether defining a first width, and the rear edge of the tether defining a second width that is less the first width.

2. The assembly of claim 1, wherein the airbag in the inflated position extends above the top end of the seat back.

3. The assembly of claim 1, further comprising a headrest supported by the seat back at the top end, the airbag in the inflated position forward of and aligned with the headrest.

4. The assembly of claim 3, wherein the front edge of the tether is at a front surface of the headrest.

5. The assembly of claim 1, wherein the front edge of the tether is above the rear edge of the tether relative to the seat back.

6. The assembly of claim 1, wherein the front edge of the tether is above the top end of the seat back.

7. The assembly of claim 1, wherein the inflation chamber extends forward of the front edge of the tether and rearward of the rear edge of the tether.

8. The assembly of claim 7, wherein the tether separates the inflation chamber into a top portion and a bottom portion, the top portion open to the bottom portion forward and rearward of the tether.

9. The assembly of claim 1, further comprising a second airbag supported by the seat back between the airbag and the bottom end of the seat back, the second airbag inflatable to a second inflated position below the airbag in the inflated position.

10. The assembly of claim 9 wherein the airbag in the inflated position includes a bottom edge and the second airbag in the second inflated position includes a top edge that extends transverse to the bottom edge.

11. The assembly of claim 10, wherein the bottom edge of the airbag abuts the top edge of the second airbag proximate to the seat back and is spaced distal from the seat back.

12. The assembly of claim 9, wherein the seat back includes a first side and a second side spaced from each other along a lateral axis, the airbag and the second airbag supported at the first side.

13. The assembly of claim 9, further comprising a seat bottom, the seat back supported by the seat bottom at the bottom end of the seat back, the second airbag in the second inflated position between the airbag in the inflated position and the seat bottom.

14. The assembly of claim 13, wherein the seat back and the seat bottom collectively define an occupant seating area having an occupant torso portion and an occupant head portion, the airbag in the inflated position at the occupant head portion and the second airbag in the second inflated position at the occupant torso portion.

15. The assembly of claim 14, wherein the occupant seating area, including the occupant head portion, corresponds to a $50^{th}$ percentile adult male hybrid III dummy.

16. The assembly of claim 9, wherein the airbag is inflatable independent of the second airbag.

* * * * *